United States Patent
Tsai et al.

(10) Patent No.: US 6,179,739 B1
(45) Date of Patent: Jan. 30, 2001

(54) CONTINUOUSLY VARIABLE TRANSMISSION WITH CONTROL ARRANGEMENT AND METHOD FOR PREVENTING TRANSMISSION BELT SLIPPAGE

(75) Inventors: Shan-Chin Tsai; William G. Durtschi, both of Rockford, IL (US)

(73) Assignee: Hamilton Sunstrand Corporation, Rockford, IL (US)

( * ) Notice: Under 35 U.S.C. 154(b), the term of this patent shall be extended for 0 days.

(21) Appl. No.: 09/222,948

(22) Filed: Dec. 30, 1998

(51) Int. Cl.[7] .......................... F16H 59/00; F16H 61/00; F16H 63/00
(52) U.S. Cl. .................................. 474/12; 474/18; 474/28
(58) Field of Search .................. 474/12, 28, 18; 477/45

(56) References Cited

U.S. PATENT DOCUMENTS

| | | |
|---|---|---|
| 3,420,344 | 1/1969 | Hilpert et al. . |
| 4,670,843 * | 6/1987 | Matsumura et al. ............... 474/12 X |
| 4,785,849 | 11/1988 | Masuda . |
| 4,793,454 | 12/1988 | Petzold et al. . |
| 4,798,561 * | 1/1989 | Hattori et al. ......................... 474/28 |
| 4,969,546 | 11/1990 | Haka . |
| 4,982,822 | 1/1991 | Petzold et al. . |
| 4,991,400 * | 2/1991 | Wilkinson ......................... 62/243 X |
| 5,007,512 | 4/1991 | Petzold . |
| 5,010,989 | 4/1991 | Huntley . |
| 5,024,310 | 6/1991 | Murano et al. . |
| 5,049,112 | 9/1991 | Gunsing . |
| 5,054,599 | 10/1991 | Marcott . |
| 5,062,049 | 10/1991 | Taylor . |
| 5,062,050 | 10/1991 | Petzold et al. . |
| 5,074,166 * | 12/1991 | Yamashita et al. ................ 477/45 X |
| 5,993,338 * | 11/1999 | Kato et al. ............................. 474/12 |

FOREIGN PATENT DOCUMENTS

2729343 * 7/1996 (FR) .
119431 * 5/1989 (JP) .

* cited by examiner

Primary Examiner—David A. Bucci
Assistant Examiner—Marcus Charles
(74) Attorney, Agent, or Firm—Antonelli, Terry, Stout & Kraus, LLP

(57) ABSTRACT

A continuously variable transmission and method for preventing transmission belt slippage in the case of a sudden increase in load torque on the transmission involves both inserting a lag in the transmission to allow the control loops time to respond to the sudden increase in load torque and speeding up the responses of the control loops in response to the sudden increase in load torque. The transmission is used to drive an aircraft electrical generator at a constant speed in the disclosed embodiment.

27 Claims, 6 Drawing Sheets

US 6,179,739 B1

CONTINUOUSLY VARIABLE TRANSMISSION WITH CONTROL ARRANGEMENT AND METHOD FOR PREVENTING TRANSMISSION BELT SLIPPAGE

FIELD OF THE INVENTION

The present invention is directed to a continuously variable transmission and, more particularly, to a control arrangement thereof and a method for preventing belt slippage in the transmission. In a disclosed preferred embodiment, the transmission is used as a constant speed drive for an aircraft electrical power generator.

BACKGROUND AND SUMMARY OF THE INVENTION

The variable pulley transmission, or continuously variable transmission (CVT) as it is commonly called, has been under development for over two decades, but its use as a power transmission is mainly for automotive applications. Its control is rather complicated and is very sensitive to operating conditions. For example, in a control arrangement for a variable pulley transmission disclosed in U.S. Pat. No. 4,458,318, a variable line pressure is controlled and applied to the sheave of the secondary or driven pulley of the transmission, and also serves as the hydraulic power supply to a ratio control valve in a speed control loop of the transmission.

It has found that due to the variable supply pressure in the continuously variable transmission of U.S. Pat. No. 4,458,318, both the pressure control valve (a pressure relief type valve) and the ratio control valve gains change with the supply pressure, and the control is therefore very sensitive to system operating conditions. There is a need for an improved continuously variable transmission with a control arrangement and method which overcome these drawbacks and disadvantages of this known continuously variable transmission. More particularly, there is a need for an improved continuously variable transmission with a control arrangement and method which are simpler and more robust than those disclosed in U.S. Pat. No. 4,458,318. It is an object of the present invention to provide a continuously variable transmission with a control arrangement and method which meet this need.

The commonly owned U.S. Pat. No. 6,099,424 for CONTINUOUSLY VARIABLE TRANSMISSION WITH CONTROL ARRANGEMENT AND METHOD FOR CONTROL ARRANGEMENT AND METHOD FOR REDUCING TRANSMISSION BELT SLIPPAGE, filed concurrently with this application and hereby incorporated by reference. However in the application of a CVT as a constant speed drive for an electrical power generator, if a large load is suddenly applied, the belt speed may start to slip. If this happens too often, damage of the belt and pulley may occur. One way to entirely avoid belt slippage would be to apply very large forces to the sheaves at all times so that even the largest possible load can be accomodated. This would definitely shorten the life of the belt. The present invention aims to provide an improved continuously variable transmission having a control arrangement and method whereby just enough forces need be applied to the sheaves to prevent the belt from slipping under all possible load conditions.

These and other objects are attained by the continuously variable transmission of the present invention for transferring drive from an engine to a device to be driven wherein the transmission comprises a primary pulley for receiving drive from an engine, a belt, a secondary pulley which is coupled over the belt to the primary pulley for transferring drive to a device to be driven, each of the primary and secondary pulleys having an axially movable sheave and a hydraulically operated actuator therefor to effect ratio change of the transmission and to maintain belt tension, and wherein a single source of constant hydraulic pressure is operatively connected for driving the actuators. In the disclosed form of the invention, the source of constant hydraulic pressure comprises a hydraulic pump and a pressure relief valve in communication with the output of the hydraulic pump to maintain a constant predetermined hydraulic output pressure of the pump. The single source of constant hydraulic pressure is operatively connected to the actuator of the primary pulley by way of a ratio control valve and to the actuator of the secondary pulley by way of a pressure control valve.

According to further features of the invention, the continuously variable transmission includes a hydraulic pressure control loop for controlling the hydraulic pressure applied to the actuator of the secondary pulley as a function of the sensed load of the device to be driven on the transmission and the pitch radius of the secondary pulley. An output speed control loop is also provided for controlling the output speed of the transmission driving the device to be driven. In the disclosed embodiment the output speed control loop may be set to control the output speed at a constant value for driving an aircraft electric generator. According to another feature of the invention, the hydraulic pressure control loop measures the speed of the generator and the load current of the generator being driven for calculation of the load torque of the generator on the transmission.

The CVT of the invention also includes a load feedforward control loop for feeding back a load signal, proportional to the load torque of the generator on the transmission to each of the hydraulic pressure control loop and the output speed control loop to speed up the responses thereof with a sudden increase in the load torque. In addition a torque lagging apparatus is provided in the transmission between the secondary pulley and the generator to insert a lag in the transmission to allow the control loops time to respond to a sudden increase in load torque for preventing belt slippage.

A method of the invention for reducing belt slippage in the case of a sudden increase in load torque of the generator on the transmission inserting a lag in the transmission between the secondary pulley and the generator to allow the control loops time to respond to the sudden increase in load torque, and speeding up the response of the control loops in response to the sudden increase in load torque.

DETAILED DESCRIPTION OF THE DISCLOSED EMBODIMENT

Figure 1:
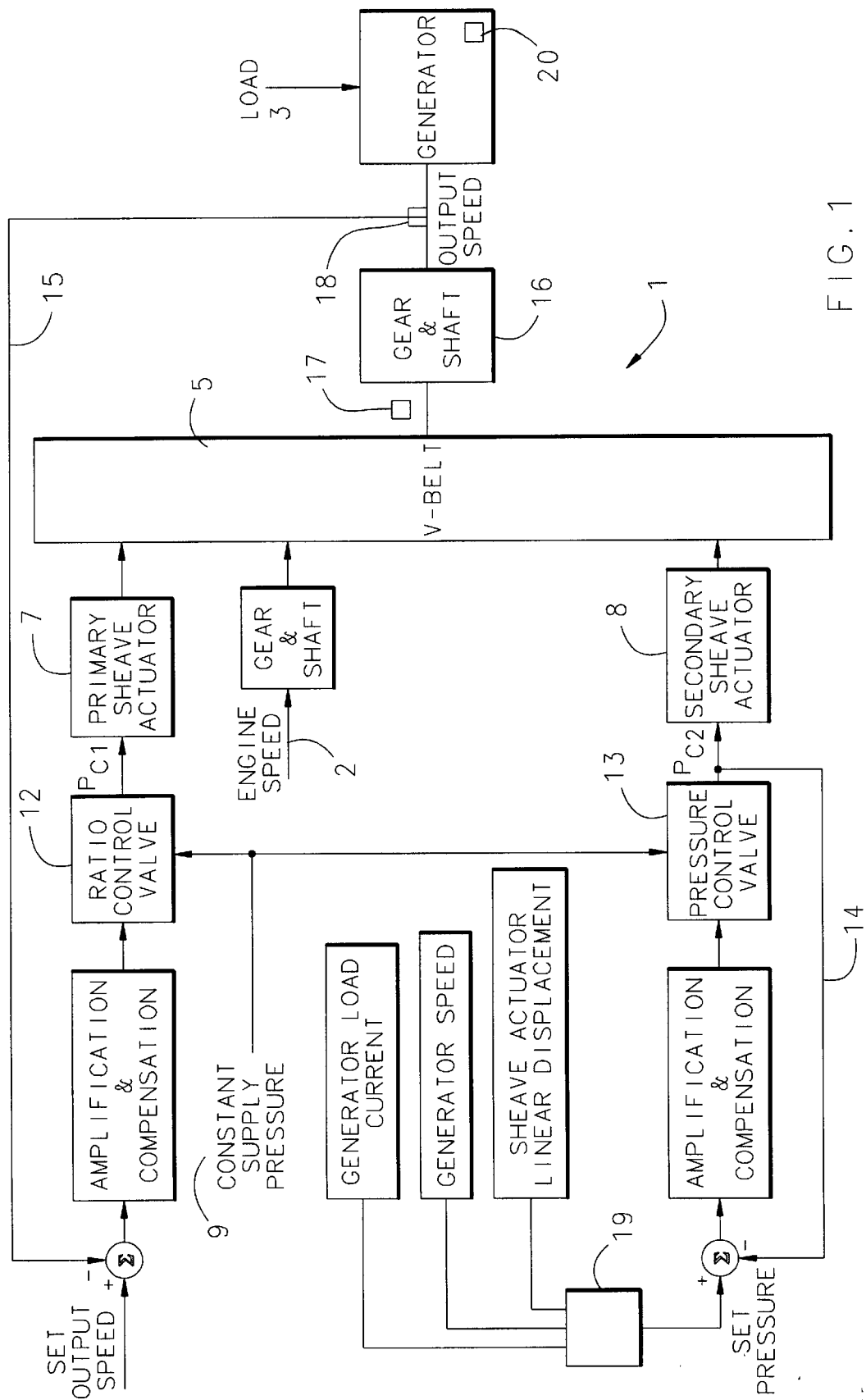
FIG. 1 is a schematic illustration of a continuously variable transmission including the control arrangement thereof for a variable pulley transmission used as a constant speed drive for an aircraft electric generator as disclosed in the aforementioned commonly owned U.S. Pat. No. 6,099,424 filed concurrently with this application.

Referring now to the drawings, FIG. 1 depicts a continuously variable transmission 1 as disclosed in U.S. Pat. No. 6,099,424 for transferring drive from an engine 2 to a device 3 to be driven. The transmission 1 comprises a primary pulley 4, shown schematically in FIG. 2, receiving drive from the engine, a belt 5 and a secondary pulley 6 which is coupled over the belt to the primary pulley 4 for transferring drive to the device 3. The primary and secondary pulleys each have a fixed sheave, 22 and 22' respectively, and an axially movable sheave, 23 and 23' respectively. The positions of the axially movable sheaves are adjustable by respective hydraulically operated actuators 7 and 8 to effect ratio change in the transmission and to maintain belt tension. A single source 9 of constant hydraulic pressure is operatively connected for driving each of the actuators 7 and 8.

Figure 2:
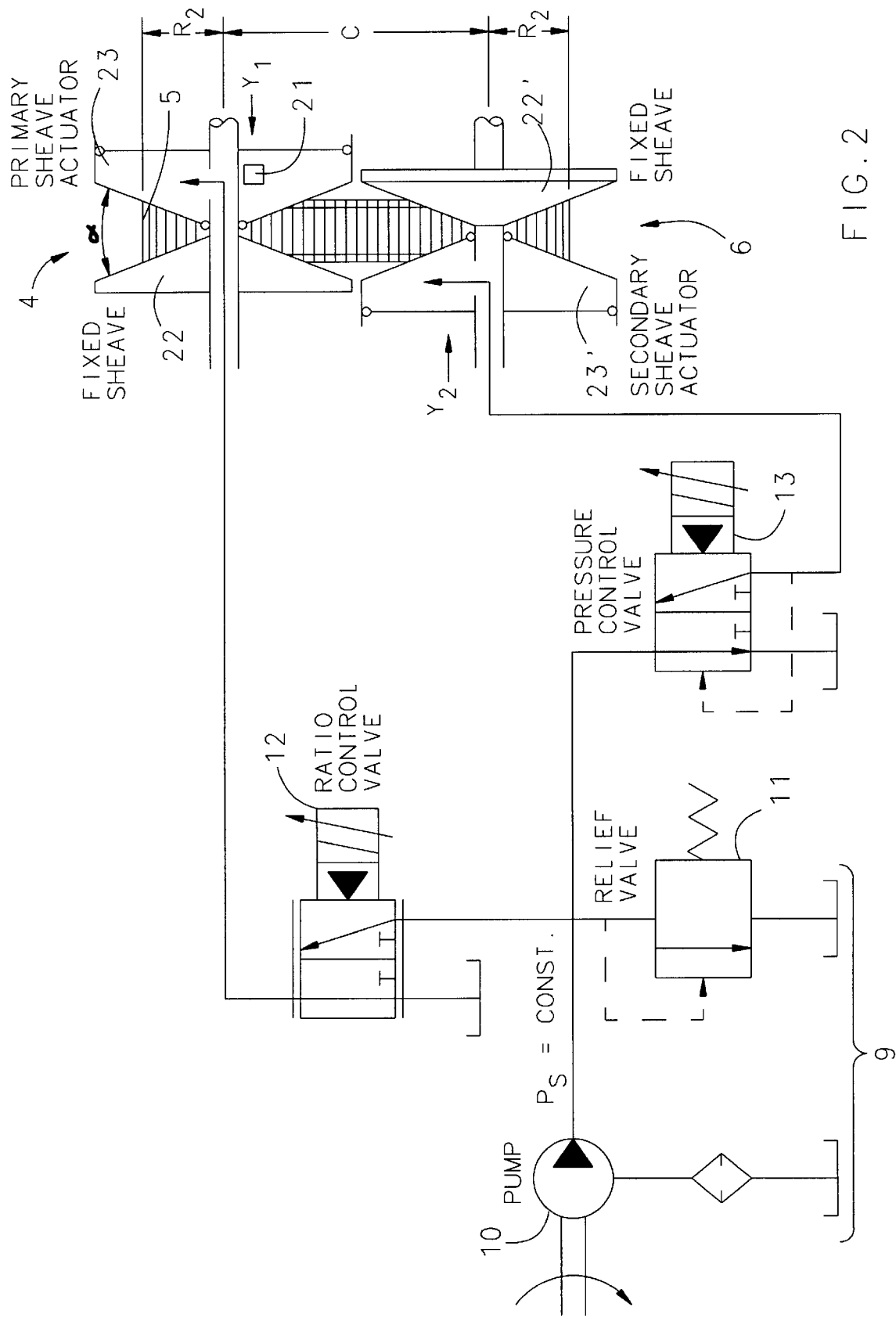
FIG. 2 is a schematic drawing of the continuously variable transmission of FIG. 1 with the hydraulic system thereof.

In the transmission 1, as illustrated in FIG. 2, the source of constant hydraulic pressure 9 comprises a hydraulic pump 10 and a pressure relief valve 11 in communication with the output of the hydraulic pump to maintain a constant predetermined hydraulic output pressure Ps of the pump as denoted in FIGS. 1 and 2. The single source of constant hydraulic pressure is operatively connected to the primary sheave actuator 7 by way of a ratio control valve 12. The ratio control valve may be a two-stage three-way servovalve of the type disclosed in U.S. Pat. No. 4,458,318, for example. The constant supply pressure 9 is operatively connected to the secondary sheave actuator 8 by way of a pressure control valve 13. The valve 13 is a pressure reducing type valve, preferably an electrohydraulic pressure reducing valve such as an electrically driven proportioning solenoid valve. Reference is made to the co-pending, commonly assigned U.S. Pat. No. 6,126,138 for PRESSURE REDUCING VALVE AND CONTINUOUSLY VARIABLE TRANSMISSION WITH CONTROL ARRANGEMENT USING SAME filed concurrently with this application and hereby incorporated by reference, for a detailed disclosure of a preferred form of the pressure reducing valve although other pressure reducing valves may be used.

For a continuously variable transmission to work properly, it has to be controlled such that, firstly, enough force is applied to the secondary sheave, the driven sheave, to keep the belt from slipping, and secondly, a variable force must be applied to the primary sheave, the driver sheave, to change the transmission ratio according to the requirement of system operation. In the disclosed embodiment, the requirement of system operation is for constant speed drive application for driving device 3, which is an aircraft electrical generator, whereby the transmission output speed must be maintained constant. The electronic-hydraulic control system of the continuously variable transmission 1 is used to control the above-mentioned two functions.

The control system consists of two main control loops: a pressure control loop 14 to control the force applied to the secondary sheave by actuator 8 for controlling belt tension, and an output speed control loop 15 for controlling the transmission ratio to maintain the transmission output speed, namely the output shaft speed of the secondary pulley 6, at a constant value under varying engine speed and generator load conditions. This control arrangement of the transmission 1 is simpler and more robust than the previous arrangement in U.S. Pat. No. 4,458,318. Without the constant supply pressure source 9, a complicated gain scheduling scheme will be required to compensate for changes in supply pressure that cause belt slippage in the conventional continuously variable transmission.

The force required to be applied to the axially movable sheave of the secondary pulley by actuator 8 to keep the belt 3 from slipping is a function of load torque and the pulley pitch radius. A method for reducing belt slippage in the continuously variable transmission comprises determining the hydraulic pressure to be applied to the actuator 8 of the secondary pulley to keep the belt from slipping. This determining step includes determining the load torque $TQ_o$ transmitted from the device to be driven to the secondary pulley of the transmission and the pitch radius $r_2$ of the secondary pulley, and calculating a value for the set pressure Pset of the hydraulic pressure control loop to be applied to the actuator 8 of the secondary pulley 6 in accordance with the relationship.

$$P_{set} = \left( \frac{TQ_o}{r_2} \cdot \frac{\cos(\alpha/2)}{2\mu} \right) / As$$

where:
$TQ_o$ is the torque on the secondary pulley from the device to be driven
$r_2$ is the secondary pulley pitch radius,
$\alpha$ is the pulley groove angle,
$\mu$ is the coefficient of friction between the belt and the secondary pulley, and
As is the area of the actuator for the sheave of the secondary pulley.

The step of determining the load torque transmitted from the generator 3 to the secondary pulley of the continuously variable pulley transmission 1 includes measuring the generator load current $I_L$ with current detector 20, the generator speed $N_G$ with speed sensor 18 and the linear displacement $Y_1$ of the primary sheave actuator 7 using detector 21. From the geometry of the primary pulley 4, its pitch radius of $r_1$ is calculated from the measured sheave actuator displacement $Y_1$. The generator torque $TQ_G$ is calculated given the measurements of $I_L$, $N_G$, and $Y_1$ as set forth below. From the constraint of constant belt length of belt 5 and constant distance between the centers of the two pulleys 4 and 6, the pitch radius $r_2$ of the driven pulley 6 is then calculated using the now known pitch radius $r_1$. Alternatively, the pitch radius $r_2$ could be directly measured using a proximity sensor, for example.

Figure 3:
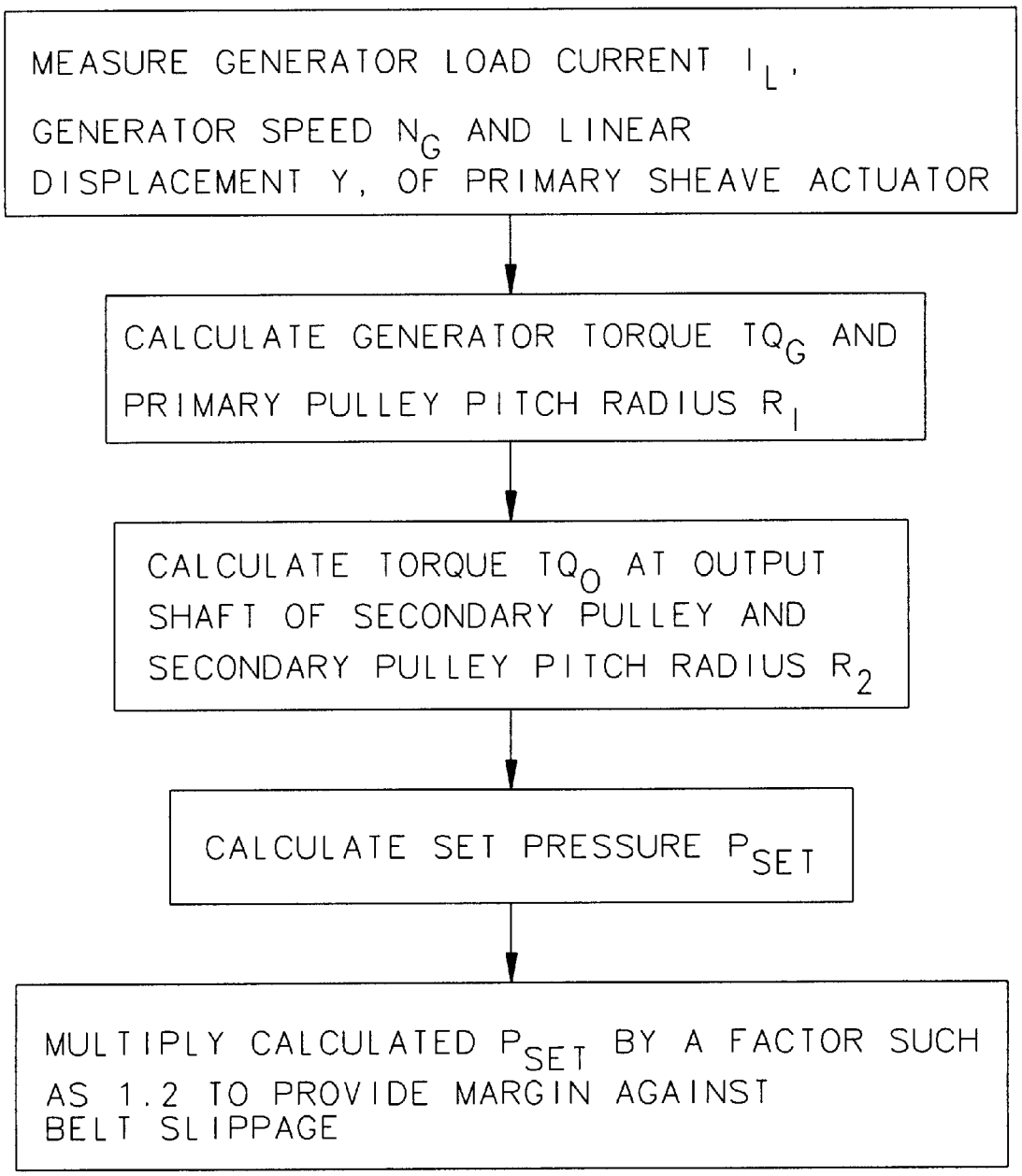
FIG. 3 is a flow chart of steps of a method for calculating and applying the appropriate pressure to the actuator of the axially movable sheave of the secondary pulley of the continuously variable transmissionof FIGS. 1 and 2.

The torque $TQ_o$ at the output shaft of the secondary pulley 6 of the transmission 1 is then calculated as set forth below using the previously calculated generator torque $TQ_G$ and the generator side gear ratio $R_{Go}$ of the gear and shaft unit 16 drivingly connected between the output shaft of the transmission and the generator 3 as depicted in FIG. 1. Using these values, the hydraulic pressure required, $P_{set}$, which serves as the command signal from calculating unit or microprocessor 19 to the pressure control loop 14, is obtained from the calculated force divided by the secondary sheave actuator area $A_s$. The procedure for calculating the set pressure $P_{set}$ for control loop 14 is set forth in the flow diagram of FIG. 3 and described in more detail below.

For sensing the load of the generator on the transmission, in addition to or instead of measuring the generator load current $I_L$, a torque sensor 17 mounted on the output shaft of the secondary pulley of the transmission can also be used. This provides an even more direct measurement of the load. Further, instead of measuring the linear displacement of the primary sheave, the displacement of the actuator of the secondary sheave can be measured for determining the pitch radius $r_2$, but there is no need to measure the displacement of both sheaves. To provide some safety margin, the calculated pressure $P_{set}$ is preferably multiplied by a factor of, for example, 1.2 to guard against belt slippage while avoiding undue force on the belt which would shorten the life of the belt and the pulleys. Calculation of the set pressure $P_{set}$ is accomplished by the suitably programmed microprocessor 19, given the measurements of $I_L$, $N_G$ and $Y_1$ and proceeds as follows:

$$\text{Power} = 3 \times 115 \times I_L$$

$$TQ_C = \frac{8.8507 \text{ Power}}{N_G(\pi/30)}$$

$$TQ_O = TQ_G / R_{GO}$$

$$r_1 = \frac{Y_1}{2 \tan(\alpha/2)}$$

$$r_2 = \frac{-(\pi c - 2r_1) + \sqrt{(\pi c - 2r_1)^2 + 4(LC - 2c^2 - \pi r_1 c - r_1^2)}}{2}$$

$$P_{set} = \left(\frac{TQ_o}{r_2} \frac{\cos(\alpha/2)}{2\mu}\right) \Big/ A_s$$

where:

$A_s$—secondary sheave actuator area, in$^2$
$\alpha$—pulley groove angle, deg
C—pulley center distance, in
L—belt length, in
$N_G$—generator speed, rpm
$r_1$—primary pulley pitch radius, in
$r_2$—secondary pulley pitch radius, in
$R_{Go}$—generator side gear ratio
$P_{set}$—set pressure of the pressure control loop
$TQ_g$—generator torque, in-lbs
$TQ_o$—torque at secondary sheave shaft, in-lbs
$Y_1$—primary sheave actuator linear displacement, in
$\mu$—coefficient of friction In the speed control loop 15, the set speed command signal is a constant, depending on the number of poles of the generator used and, for example, is selected to give a 400 cps revolution at the generator shaft in the case of a two pole generator, or a 200 cps revolution in the case of four pole machine. The generator speed is measured by a sensor 18, FIG. 1, and compared with the set output speed command. The sensor 18 also provides a generator speed signal to calculating unit 19. The unbalanced forces applied on the primary and secondary sheaves causes the continuously variable transmission ratio to change. Given a force applied on the secondary sheave, the speed control loop 15 will automatically adjust the force applied on the primary sheave to change the transmission ratio by way of ratio control valve 12 to match the generator speed to the speed command.

Figure 4:
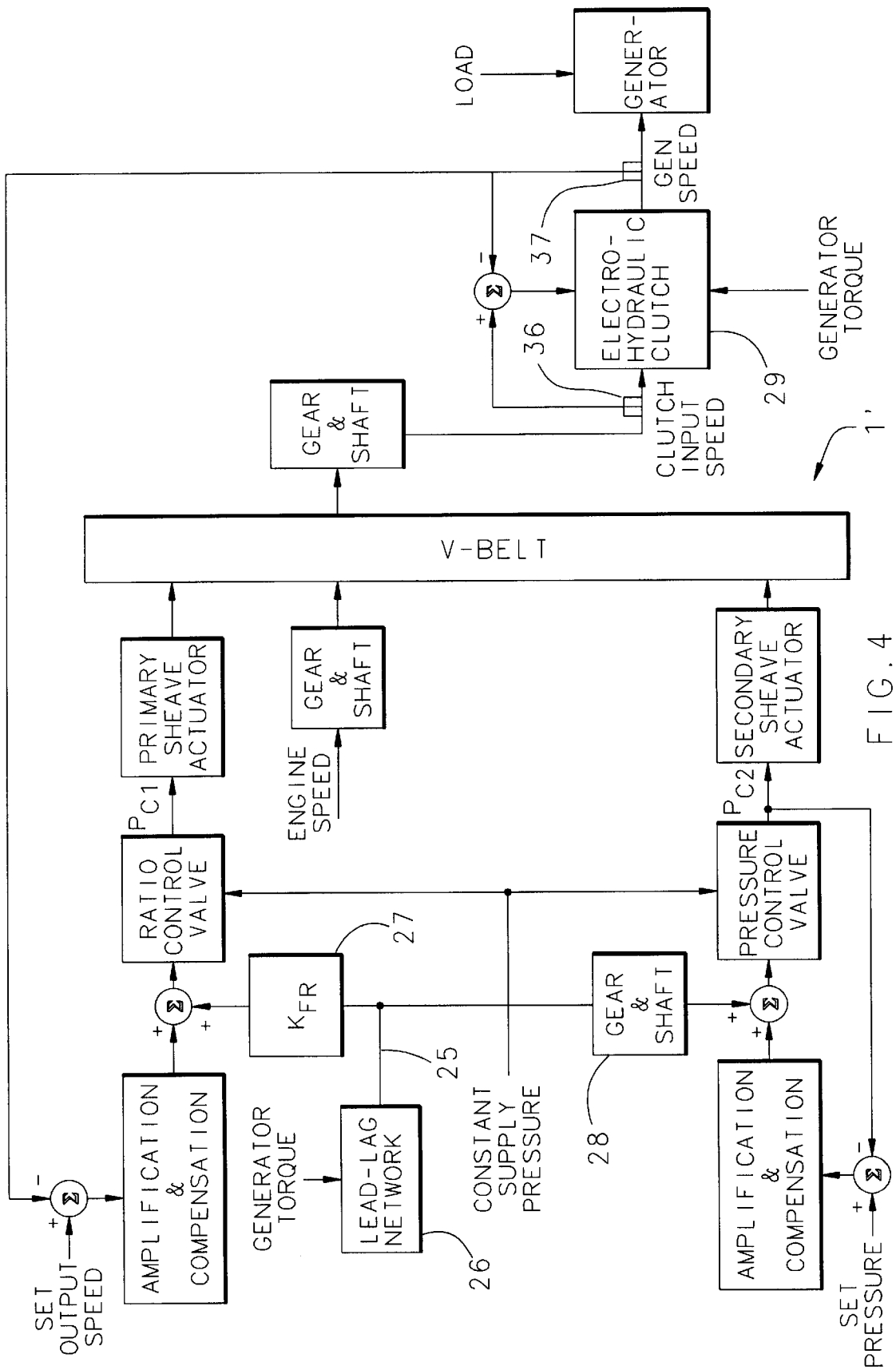
FIG. 4 is a schematic illustration of continuously variable transmission of the present invention including a control sheave to prevent the belt from slipping.
Figure 5:
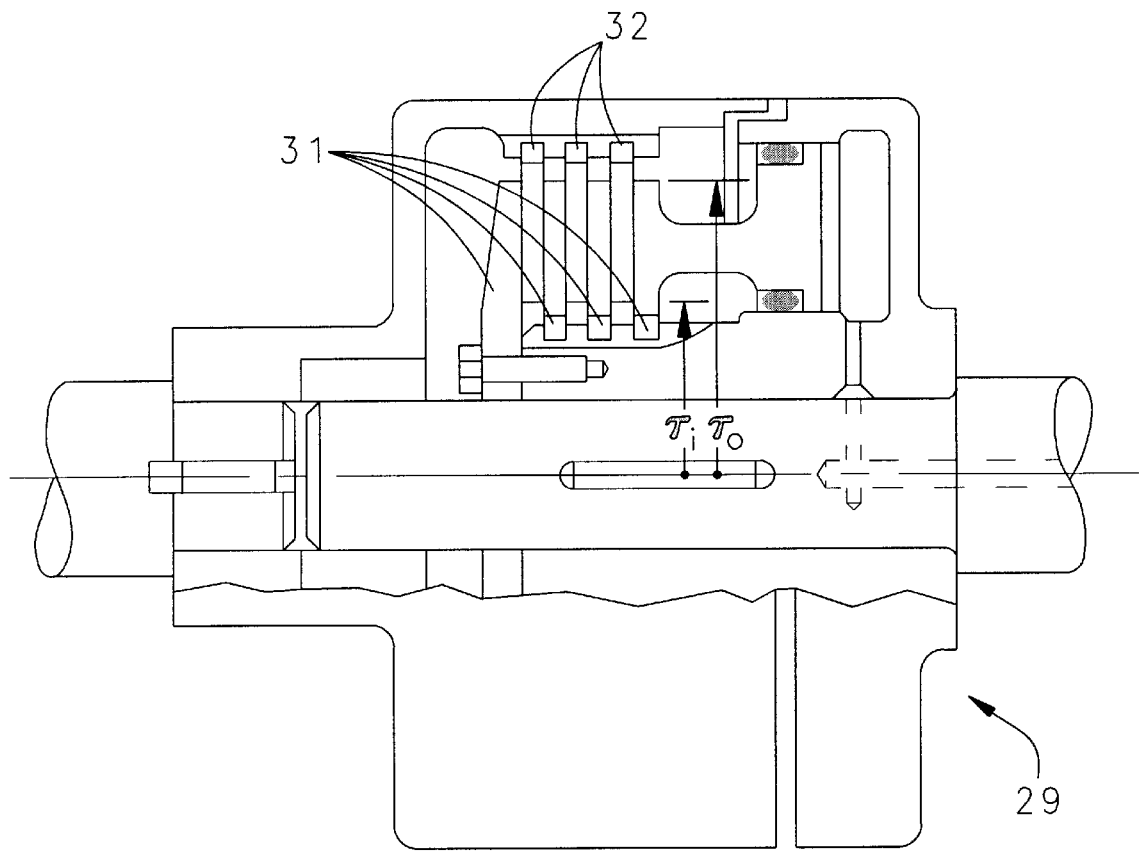
FIG. 5 is a side view, partially in crosssection along the longitudinal central axis of the hydraulically operated multi-disk clutch used in the transmission of FIG. 4.
Figure 6:
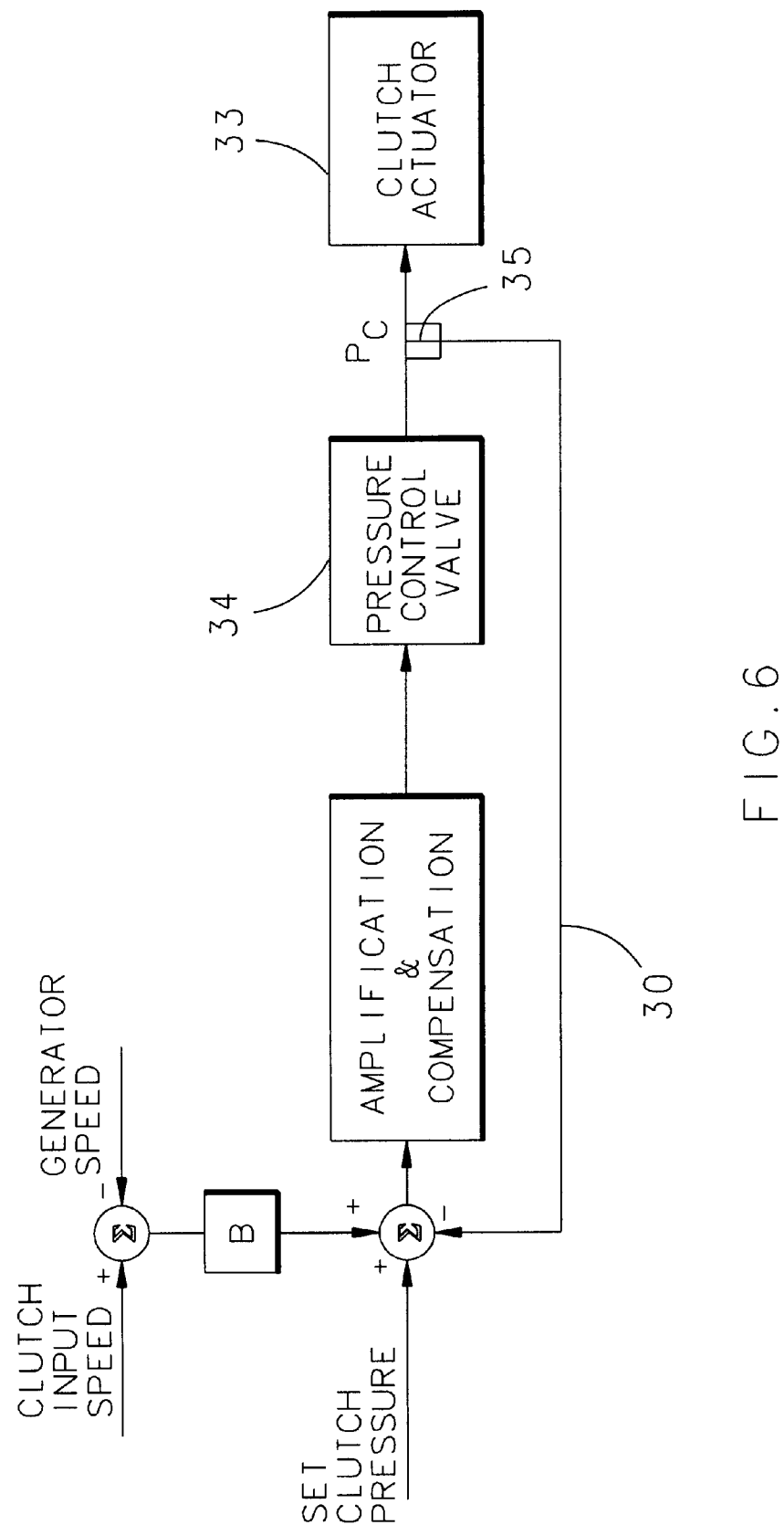
FIG. 6 is a schematic drawing of the clutch control system for the clutch in the transmissions of FIG. 4.

The continuously variable transmission 1' of FIGS. 4–6 employs the basic control arrangement described above in connection with the CVT 1 of FIGS. 1–3 as a constant speed drive for generating electricity. When driving an electric generator with the continuously variable transmission, if a large electrical load is suddenly applied to the generator, the torque generated at the generator would be transmitted almost immediately to the sheaves of the CVT, and if the pressures applied of the sheaves are not large enough, the belt will start to slip. It will take a little while for the pressure control loop 14 and the output speed control loop 15 to respond to the load change. The CVT 1' of FIGS. 4–6 includes two additional control aspects that are used in combination for preventing belt slippage in the transmission. The two control aspects to prevent the belt from slipping includes speeding up the response of the two control loops by feeding forward the load signal, and delaying the transmission of the load torque from the generator to the sheaves by installing a torque lagging apparatus in the transmission between the secondary pulley and the generator to insert a lag in the transmission.

More particularly, the CVT 1' FIGS. 4–6 includes a load feed-forward control loop 25 for feeding back a load signal, proportional to the load torque of the generator 3 on the transmission, to each of the hydraulic pressure control loop 14 and the output speed control loop 15 to speed up the responses thereof with a sudden increase in the load torque for preventing transmission belt slippage. The load feed-forward control loop 25 comprises a lead-lag network 26 through which the load signal is passed before being applied to the hydraulic pressure control loop and the output speed of the control loop. Adjustable gain elements 27 and 28 are provided for adjusting the gain of the load signal fed back to respective ones of the hydraulic pressure control loop and the output speed control loop as depicted in FIG. 4. This feed-forward control speeds up the response of both the control loops to the load change.

In the continuously variable transmission 1 of the embodiment of FIGS. 4–6 further includes a torque lagging apparatus 29 in the transmission between the secondary pulley 6 and the generator 3 to insert a lag in the transmission to allow the control loops 14 and 15 time to respond to a sudden increase in load torque of the generator on the transmission for preventing transmission belt slippage. In the disclosed form of the invention, the torque lagging apparatus 29 is in the form of an electrohydraulically controlled (or electro-magnetically controlled) clutch. A hydraulic pressure control loop 30 of the transmission 1' applies a hydraulic pressure to the clutch to allow clutch slippage upon a sudden increase in load torque for providing lag and load torque transmission.

The hydraulic clutch 29 comprises a plurality of driving and driven disks 31 and 32, respectively which are axially clamped adjacent one another by clutch actuactor 33 with a force control by a pressure control valve 34 of the hydraulic clutch pressure control loop 30. The pressure control valve 34 is preferably and electrically hydraulic pressure reducing valve as disclosed in the commonly owned, concurrently filed U.S. Pat. No. 6,126,138, although other pressure control valves could be employed. The pressure control valve 34 can be operated either open-loop or closed-loop. For closed-loop control as in the disclosed embodiment, a pressure sensor 35 is required for closing the loop. The pressure reference signal consists of two parts: one part (set clutch pressure) is proportional to the load signal, and the other proportional to the difference of the clutch input speed and output or generator speed detected by speed sensors 36 and 37, respectively. This latter part of the pressure reference signal is reduced to zero when the clutch is locked up. During constant load operation, only enough pressure is applied to the disks for the clutch 29 to transmit the load torque. For a sudden load increase, the clutch will start to slip until the clutch pressure control 30 catches up and the clutch locks up again. This action provides a lag in load torque transmission to the secondary pulley 6 of the CVT 1', which allows the CVT pressure control loop 14 to respond to the load torque change without allowing the belt to slip.

The hydraulic clutch pressure control loop 30 is shown schematically in FIG. 6. The clutch pressure is negatively fed back and substracted from the commanded or set clutch pressure and the difference between the clutch input speed and the generator speed is added to the set clutch pressure command.

A method of the invention for calculating the set clutch pressure command comprises measuring the load current and generator speed and, if necessary, the load voltage, and calculating a load torque using these load measurements. The set clutch pressure required to lock the clutch is then calculated. The calculation of set clutch pressure given the mesurements of load current and generator speed is carried out as follows. Calculation of set clutch pressure given the measurement of $I_L$ and $N_G$.

$$\text{Power} = 3 \times 115 \times I_L$$

$$TQ_C = \frac{8.8507 \text{ Power}}{N_G(\pi/30)}$$

$$\text{where: } P_{cset} = f \cdot \frac{3}{2}\left(\frac{r_o^2 - r_i^2}{r_o^3 - r_i^3}\right)\left(\frac{TQ_C}{\mu N A_{CL}}\right)$$

$A_{CL}$—clutch actuator area, in$^2$
$I_L$—load current, amp
$N_G$—generator speed, rpm
$TQ_G$—generator torque, in-lbs
N—number of friction surfaces
$r_o$—outside radius of contact of surfaces, in
$r_i$—inside radius of contact of surfaces, in
$\mu$—coefficient of friction In a sense, the clutch 29 has a variable torque capacity depending on the pressure applied. During constant load operation, just enough pressure is applied for the clutch to transmit the load torque. For a sudden load increase, due to the lag of the clutch pressure control, the clutch will start to slip until the pressure control catches up and the clutch locks up again. This clutch slipping provides a lag in the transmission of the load torque to the CVT secondary pulley 6, thus allowing the CVT pressure control to catch up with the load so that the slipping of the belt 5 in the CVT can be prevented. Studies have shown that the combination of the aforementioned features of the present invention are effective for preventing slipping, even in the case of a sudden increase of load torque of the generator on the transmission.

While only a preferred embodiment of the invention has been disclosed herein it is apparent that various modifications and alterations of the invention may be made. For example, the aforementioned two control aspects of the invention can be used independently, as well as in combination as in the disclosed embodiment. It is therefor the intention in the appended claims to cover all such modifications and alterations as may fall within the spirit and scope of the invention.

We claim:

1. A continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven that exerts a load on said transmission, said primary an secondary pulleys each having an axially movable sheave and a hydraulically operated actuator therefor to effect ration change of the transmission and to maintain belt tension, a hydraulic pressure control loop for controlling the hydraulic pressure applied to the actuator of said secondary pulley as a function of the load of said device to be driven on said transmission and the pitch radius of the secondary pulley, an output speed control loop for controlling the hydraulic pressure applied to the actuator of said primary pulley and thereby the output speed of said transmission driving said device to be driven, and a torque lagging apparatus in the transmission between the secondary pulley and the device to be driven to insert a lag in the load torque transmission to allow the control loops time to respond to a sudden increase in load torque of said device to be driven on said transmission for preventing transmission belt slippage.

2. The transmission according to claim 1, wherein said torque lagging apparatus comprises a hydraulic clutch and a hydraulic clutch pressure control loop which applies a hydraulic pressure to said clutch to allow clutch slippage upon a sudden increase in load torque for providing said lag in load torque transmission.

3. The transmission according to claim 2, wherein said hydraulic clutch comprises a plurality of driving and driven disks which are axially clamped adjacent one another by a clutch actuator with a force controlled by a pressure control valve of said hydraulic clutch pressure control loop.

4. The transmission according to claim 2, wherein said hydraulic clutch pressure control loop, during constant load operation of said transmission, applies sufficient hydraulic pressure to said clutch so that said clutch transmits the load torque without clutch slippage.

5. The transmission according to claim 2, wherein said hydraulic clutch pressure control loop controls the hydraulic pressure applied to the clutch as a function of load of said device to be driven.

6. The transmission according to claim 5, wherein said device to be driven is an electric generator and said hydraulic clutch pressure control loop determines the load torque of said generator and therefrom a set clutch pressure required to lock the clutch during constant load operation.

7. The transmission according to claim 6, wherein said hydraulic clutch pressure control loop measures the speed of said generator and the load current of said generator for calculation of said load torque of said generator.

8. The transmission according to claim 6, wherein said hydraulic clutch pressure control loop is a closed loop control having a hydraulic pressure sensor for detecting the hydraulic pressure applied to the clutch and feeding a signal thereof as a reference for determining said clutch pressure.

9. The transmission according to claim 6, wherein said hydraulic clutch pressure control loop further comprises means for detecting a difference between the input and output speeds of said clutch and feeding back a signal thereof as a reference to enforce lockup of the clutch.

10. A continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven that exerts a load on said transmission, said primary and secondary pulleys each having an axially movable sheave and a hydraulically operated actuator therefor to effect ratio change of the transmission and to maintain belt tension, a hydraulic pressure applied to the actuator of said secondary pulley as a function of the load of said device to be driven, on said transmission and the pitch radius of the secondary pulley, an output speed control loop for controlling the hydraulic pressure applied to the actuator of said primary pulley and thereby the output speed of said transmission driving said device to be driven, a load feed-forward control loop for feeding back a load signal, proportional to the load torque of said device to be driven on said transmission, to each of said hydraulic pressure control loop and said output speed control loop to speed up the responses thereof with a sudden increase in said load torque for preventing transmission belt slippage, and a torque lagging apparatus in the transmission between the secondary pulley and the device to be driven to insert a lag in the transmission to allow the control loops time to respond to a sudden increase in load torque of said device to be driven on said transmission for preventing transmission belt slippage.

11. The transmission according to claim 10, wherein said load feed-forward control loop comprises a lead-lag network through which said load signal is passed before being applied to said hydraulic pressure control loop and said output speed control loop.

12. The transmission according to claim 11, wherein said load feed-forward control loop further comprises adjustable gain elements for adjusting the gain of said load signal fed back to respective ones of said hydraulic pressure control loop and said output speed control loop.

13. The transmission according to claim 10, wherein said hydraulic pressure control loop includes a hydraulic pressure control valve operatively connected between a source of hydraulic pressure and said actuator of said secondary pulley.

14. The transmission according to claim 10, wherein said output speed control loop includes a ratio control valve operatively connected between a source of hydraulic pressure and said actuator of said primary pulley.

15. The transmission according to claim 10, further comprising a single source of constant hydraulic pressure operatively connected for driving each of said actuators, said source of constant hydraulic pressure comprising a hydraulic pump and a pressure relief valve in communication with the output of said hydraulic pump to maintain a predetermined hydraulic output pressure at the pump.

16. The transmission according to claim 10, wherein said output speed control loop may be set to control said output speed at a constant value.

17. The transmission according to claim 10, in combination with an electric generator as said device to be driven.

18. The transmission according to claim 17, wherein said hydraulic pressure control loop measures the speed of the generator and the load current of said generator for calculation of a load torque of said generator on said transmission.

19. The transmission according to claim 10, wherein said hydraulic pressure control loop measures a load torque on an output shaft of said secondary pulley driving said device to be driven.

20. The transmission according to claim 10, wherein said torque lagging apparatus comprises a hydraulic clutch and a hydraulic clutch pressure control loop which applies a hydraulic pressure to said clutch to allow clutch slippage upon a sudden increase in load torque for providing said lag in load torque transmission.

21. The transmission according to claim 20, wherein said hydraulic clutch comprises a plurality of driving and driven disks which are axially clamped adjacent one another by a clutch actuator with a force controlled by a pressure control valve of said hydraulic clutch pressure control loop.

22. The transmission according to claim 20, wherein said hydraulic clutch pressure control loop, during constant load operation of said transmission, applies just enough hydraulic pressure to said clutch so that said clutch transmits the load torque without clutch slippage.

23. The transmission according to claim 20, wherein said hydraulic clutch pressure control loop controls the hydraulic pressure applied to the clutch as a function of the sensed load of said device to be driven.

24. The transmission according to claim 10, wherein said device to be driven is an electric generator and said hydraulic clutch pressure control loop determines the load torque of said generator and therefrom, a set clutch pressure required to lock the clutch during constant load operation.

25. The transmission according to claim 24, wherein said hydraulic clutch pressure control loop measures the speed of said generator and the load current of said generator for calculation of said load torque of said generator.

26. The transmission according to claim 24, wherein said hydraulic clutch pressure control loop is a closed loop control having a hydraulic pressure sensor for detecting the hydraulic pressure applied to the clutch and feeding a signal thereof as a reference to enforce lockup of the clutch.

27. The transmission according to claim 24, wherein said hydraulic clutch pressure control loop further comprises means for detecting a difference between the input and output speeds of said clutch and feeding back a signal thereof as a reference to enforce lockup of the clutch.

* * * * *